United States Patent
Connors, Jr. et al.

(10) Patent No.: US 12,348,484 B2
(45) Date of Patent: Jul. 1, 2025

(54) MULTI-DATA PLANE ARCHITECTURE FOR SEAMLESS UPGRADES

(71) Applicant: Cisco Technology, Inc., San Jose, CA (US)

(72) Inventors: Stephen Craig Connors, Jr., Nashville, TN (US); Mili Anand Taggarsi, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/410,078

(22) Filed: Jan. 11, 2024

(65) Prior Publication Data

US 2025/0039082 A1 Jan. 30, 2025

Related U.S. Application Data

(60) Provisional application No. 63/516,448, filed on Jul. 28, 2023.

(51) Int. Cl.
*H04L 9/40* (2022.01)
*G06F 11/362* (2025.01)
(Continued)

(52) U.S. Cl.
CPC ...... *H04L 63/0236* (2013.01); *G06F 11/3636* (2013.01); *H04L 9/3247* (2013.01); *H04L 41/0806* (2013.01); *H04L 41/0816* (2013.01); *H04L 41/082* (2013.01); *H04L 41/0869* (2013.01); *H04L 41/0895* (2022.05);
(Continued)

(58) Field of Classification Search
None
See application file for complete search history.

(56) References Cited

U.S. PATENT DOCUMENTS 11,750,568 B1* 9/2023 Rasekh ............... H04L 67/56 726/1
2014/0258541 A1 9/2014 Di Benedetto et al.
(Continued)

OTHER PUBLICATIONS

Hatonen S., et al., "Programmable Session Layer Multi-Connectivity", IEEE Access, vol. 10, Published on Dec. 23, 2021, Current Version Jan. 18, 2022 pp. 5736-5752.

*Primary Examiner* — Quang N Nguyen
(74) *Attorney, Agent, or Firm* — Polsinelli P.C.

(57) ABSTRACT

A system and method are provided for implementing a network component, such as a software-defined wide area network, a firewall, a router, or a load balancer. The network component can be an embedded network edge device that is implemented, e.g., in software, in circuitry, or using hardware acceleration (e.g., a data processing unit (DPU), a smart network interface card (SmartNIC), etc.). The system can include multiple dataplanes, including a primary dataplane and a shadow dataplane. A packet dispatcher relays received data packets to a primary dataplane and the shadow dataplane. The primary dataplane applies a current version of the network component to data packets, and the secondary dataplane applies a new version of the network component to identical replicas of the data packets. A control plane agent compares performance data gathered from the respective dataplanes to perform verification testing on the new version of the network component.

18 Claims, 9 Drawing Sheets

(51) Int. Cl.
  *H04L 9/32* (2006.01)
  *H04L 41/0806* (2022.01)
  *H04L 41/0816* (2022.01)
  *H04L 41/082* (2022.01)
  *H04L 41/0869* (2022.01)
  *H04L 41/0895* (2022.01)
  *H04L 43/50* (2022.01)
  *H04L 45/24* (2022.01)
  *H04L 45/80* (2022.01)

(52) U.S. Cl.
  CPC .............. *H04L 43/50* (2013.01); *H04L 45/24* (2013.01); *H04L 45/80* (2022.05); *H04L 63/0218* (2013.01); *H04L 63/0263* (2013.01); *H04L 63/0435* (2013.01); *H04L 63/123* (2013.01); *H04L 63/1425* (2013.01); *H04L 63/1433* (2013.01); *H04L 63/145* (2013.01); *H04L 63/166* (2013.01); *H04L 63/20* (2013.01)

(56) References Cited

U.S. PATENT DOCUMENTS

| | | |
|---|---|---|
| 2018/0241627 A1 | 8/2018 | Rodrigues et al. |
| 2019/0058649 A1 | 2/2019 | Qi et al. |
| 2020/0236045 A1 | 7/2020 | Bays et al. |
| 2022/0006726 A1* | 1/2022 | Michael ................ H04L 45/745 |
| 2022/0191248 A1 | 6/2022 | Pieczul et al. |
| 2023/0108209 A1* | 4/2023 | Pilkington .......... H04L 67/1012 709/217 |
| 2023/0370422 A1* | 11/2023 | Singh .................. H04L 63/0263 |

\* cited by examiner

MULTI-DATA PLANE ARCHITECTURE FOR SEAMLESS UPGRADES

CROSS-REFERENCE TO RELATED APPLICATIONS

This application claims priority to U.S. provisional application No. 63/516,448, titled "Data Processing Units (DPUs) and extended Berkley Packet Filters (eBPFs) for Improved Security," and filed on Jul. 28, 2023, which is expressly incorporated by reference herein in its entirety.

BACKGROUND

In software as a service (SaaS) deployments, upgrades to the software can be seamless with little to no impact on the users. This is achieved by performing the upgrades in a manner that is largely abstracted away from users, e.g., by rolling upgrades across multiple Kubernetes containers, by slowly shifting the load from the old version to the new versions (e.g., blue/green deployment), and monitoring the new versions. This allows continuous integration, continuous deployment (CI/CD) where the SaaS software can be kept updated.

In contrast, for infrastructure and devices at the network edge (e.g., SD-WAN appliances, firewalls, and load balancers), upgrades and maintenance have been more disruptive to users. More particularly, upgrading embedded devices at the network edge has presented several challenges. First, these infrastructure upgrades often introduce downtime due to device failover and/or route re-convergence, and therefore these infrastructure upgrades can require a scheduled maintenance window. Second, these infrastructure upgrades often entail exhaustive pre- and post-upgrade checks to ensure that the new software or policy does not negatively affect the network. Third, in case the upgrade fails, these infrastructure upgrades often include rollback and other contingency plans. Fourth, in-house testing, which occurs before the deployment/production phase, can fail to identify issues due to differences between the in-house settings/environment and the production settings/environment (e.g., the customer's own network). Thus, even after in-house testing of the upgrade, uncertainty remains because the in-house testing might fail to identify issues related to unique to characteristics of the customer's own network.

Accordingly, improved methods and systems are desired for upgrading network edge devices. For example, improvements are desired that allow for seamless upgrades that are not disruptive to users of the network.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
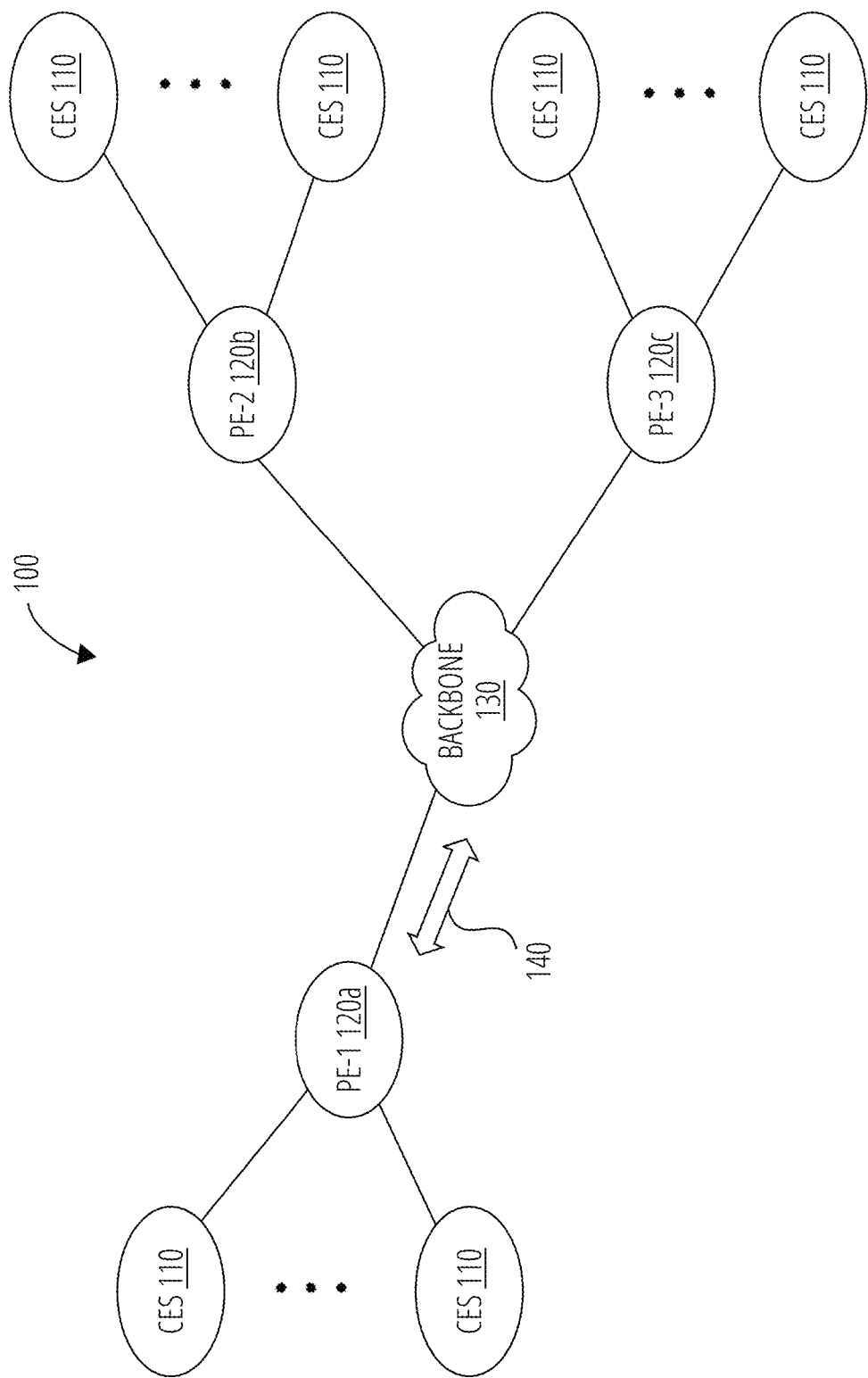
FIG. 1A illustrates a block diagram of a first example of a network, in accordance with certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method is provided for implementing a network component. The method includes receiving, at one or more ports of a network device, ingress traffic comprising data packets; and relaying, through a packet dispatcher, the received data packets of the ingress traffic to a first dataplane and a second dataplane. The method further includes applying, at the first dataplane, first networking instructions of the network component to a first subset of the relayed data packets to determine first egress data packets; and applying, at the second dataplane, second networking instructions of the network component to a second subset of the relayed data packets to determine second egress data packets. The first dataplane is configurable to operate as a primary dataplane and the second dataplane is configurable to operate as a shadow dataplane.

In another aspect, the method may also include that the first dataplane and second dataplane are configured to switch between a first configuration and a second configuration, wherein in the first configuration both the primary dataplane and the shadow dataplane are active and in the second configuration the primary dataplane is active and the shadow dataplane is in standby.

In another aspect, the method may also include switching the packet dispatcher between a mirrored configuration and a non-mirrored configuration. When in the mirrored configuration, the packet dispatcher mirrors the packets sent to the first dataplane and the second dataplane such that the first subset of the relayed data packets and the second subset of the relayed data packets are identical. When in the mirrored configuration, the packet dispatcher sends different subsets of packets to the first dataplane and the second dataplane, such the first subset of the relayed data packets is different from the second subset of the relayed data packets.

In another aspect, the method may also include storing state information in a memory that is accessible to the packet dispatcher, the first dataplane, and the second dataplane, such that the first dataplane and the second dataplane are stateless.

In another aspect, the method may also include that the first dataplane is implemented in a first data processing unit (DPU). The second dataplane is implemented in a second DPU, and the packet dispatcher is implemented in only one of the first DPU and the second DPU.

In another aspect, the method may also include that, when in a scale-out mode, the second DPU is configured to implement a second packet dispatcher.

In another aspect, the method may also include switching the one or more ports, the first dataplane, and the second dataplane between a first configuration and a second configuration. In the first configuration, the first egress data packets are transmitted from the one or more ports and the second egress data packets are not transmitted from the one or more ports. In the second configuration, the first egress data packets are transmitted from the one or more ports and the second egress data packets are transmitted from the one or more ports.

In another aspect, the method may also include gradually transitioning the one or more ports, the first dataplane, and the second dataplane from a first configuration and a second configuration. In the first configuration, the first egress data packets are transmitted from the one or more ports and the second egress data packets are not transmitted from the one or more ports. In the second configuration, the first egress data packets are not transmitted from the one or more ports and the second egress data packets are transmitted from the one or more ports thereby promoting the second dataplane to be a new primary dataplane and the first dataplane to be a new shadow dataplane.

In another aspect, the method may also include controlling, using a control-plane agent, transitions among a plurality of modes for the packet dispatcher, the first dataplane, and the second dataplane among a plurality of modes, and receiving, at the control-plane agent, signals from the first dataplane and the second dataplane, wherein the signals represent a performance of the first dataplane when applying the first networking instructions and a performance of the second dataplane when applying the second networking instructions.

In another aspect, the method may also include that the network component is configured to provide data-packet filtering, load balancing, security screening, malware detection, firewall protection, data-packet routing, data-packet switching, data-packet forwarding, computing header checksums, or implementing network policies.

In another aspect, the method may also include that the network component is either implemented on one or more data processing units (DPUs) or implemented as software executed on one or more central processing units (CPUs).

In one aspect, a computing apparatus includes a processor. The computing apparatus also includes a memory storing instructions that, when executed by the processor, configure the apparatus to perform the respective steps of any one of the aspects of the above recited methods.

In one aspect, a computing apparatus includes a processor. The computing apparatus also includes a memory storing instructions that, when executed by the processor, configure the apparatus to receive, at one or more ports of a network device, ingress traffic comprising data packets; relay, through a packet dispatcher, the received data packets of the ingress traffic to a first dataplane and a second dataplane; apply, at the first dataplane, first networking instructions of the network component to a first subset of the relayed data packets to determine first egress data packets; and apply, at the second dataplane, second networking instructions of the network component to a second subset of the relayed data packets to determine second egress data packets, wherein the first dataplane is configurable to operate as a primary dataplane and the second dataplane is configurable to operate as a shadow dataplane.

In one aspect, an apparatus is provided for implementing a network component. The apparatus includes one or more ports that receive ingress traffic and transmit egress traffic; and a packet dispatcher that relays received data packets of the ingress traffic to a first dataplane and a second dataplane. The apparatus also includes the first dataplane applies first networking instructions of the network component to a first subset of the relayed data packets to determine first egress data packets; and the second dataplane applies second networking instructions of the network component to a second subset of the relayed data packets to determine second egress data packets. The first dataplane is configurable to operate as a primary dataplane and the second dataplane is configurable to operate as a shadow dataplane.

In apparatus may also include that the first dataplane and second dataplane are configured to switch between a first configuration and a second configuration, wherein in the first configuration both the primary dataplane and the shadow dataplane are active and in the second configuration the primary dataplane is active and the shadow dataplane is in standby.

In apparatus may also include that both the first dataplane and second dataplane are deployed on high availability.

In apparatus may also include that the packet dispatcher is configured to switch between a mirrored configuration and a non-mirrored configuration. In the mirrored configuration, the packet dispatcher mirrors the packets sent to the first dataplane and the second dataplane such that the first subset of the relayed data packets and the second subset of the relayed data packets are identical. In the mirrored configuration, the packet dispatcher sends different subsets of packets to the first dataplane and the second dataplane, such the first subset of the relayed data packets is different from the second subset of the relayed data packets.

In apparatus may also include a memory that stores state information, the memory being accessible to the packet dispatcher, the first dataplane, and the second dataplane, such that the first dataplane and the second dataplane are stateless.

In apparatus may also include that the first dataplane is implemented in a first data processing unit (DPU), the second dataplane is implemented in a second DPU, and the packet dispatcher is implemented in only one of the first DPU and the second DPU.

In apparatus may also include that the second DPU is configured to implement a second packet dispatcher, when in a scale-out mode.

In apparatus may also include a plurality of dataplanes comprising an even number N of dataplanes, with N/2 primary dataplanes that are respectively mirrored to N/2 shadow dataplanes; a plurality of packet dispatchers comprising a total of N/2 packet dispatchers that are respectively associated with the N/2 primary dataplanes and the N/2 shadow dataplanes; and each dataplane pair comprising one of the N/2 primary dataplanes with a corresponding one of the N/2 shadow dataplanes being configured to switch between a first configuration and a second configuration. In the first configuration, both the primary dataplane and the shadow dataplane of the dataplane pair are active. In the second configuration, the primary dataplane of the dataplane pair is active and the shadow dataplane of the dataplane pair is in standby.

In apparatus may also include a plurality of dataplanes comprising an even number N of dataplanes, with N/2 primary dataplanes that are respectively mirrored to N/2 shadow dataplanes; a plurality of packet dispatchers comprising a total of N/2 packet dispatchers that are respectively associated with the N/2 primary dataplanes and the N/2 shadow dataplanes; and each dataplane pair comprising one of the N/2 packet dispatchers being associated with one of the N/2 primary dataplanes and a corresponding one of the N/2 shadow dataplanes. The packet dispatcher of the dataplane pair is configured to switch between a first configuration and a second configuration. In the first configuration, the packet dispatcher of the dataplane pair mirrors a subset data packets sent to the shadow dataplane of the dataplane pair with a subset data packets sent to the primary dataplane of the dataplane pair. In the second configuration, the packet dispatcher of the dataplane pair selects the subset data packets sent to the shadow dataplane of the dataplane pair to be unique with respect to subset data packets sent to the primary dataplane of the dataplane pair.

In apparatus may also include that the one or more ports, the first dataplane, and the second dataplane are configured to switch between a first configuration and a second configuration, in the first configuration, the first egress data packets are transmitted from the one or more ports and the second egress data packets are not transmitted from the one or more ports, and in the second configuration, the first egress data packets are transmitted from the one or more ports and the second egress data packets are transmitted from the one or more ports.

In apparatus may also include that the one or more ports, the first dataplane, and the second dataplane are configured to gradually transition between a first configuration and a second configuration, in the first configuration, the first egress data packets are transmitted from the one or more ports and the second egress data packets are not transmitted from the one or more ports, and in the second configuration, the first egress data packets are not transmitted from the one or more ports and the second egress data packets are transmitted from the one or more ports, to thereby promote the second dataplane to be a new primary dataplane and the first dataplane to be a new shadow dataplane.

In apparatus may also include a control-plane agent that controls the first dataplane and the second dataplane, wherein the control-plane agent controls which mode of a plurality of modes the apparatus is in, and the control-plane agent receives signals, the signals representing a performance of the first dataplane when applying the first networking instructions, and the signals representing a performance of the second dataplane when applying the second networking instructions.

In apparatus may also include that the network component is configured to provide data-packet filtering, load balancing, security screening, malware detection, firewall protection, data-packet routing, data-packet switching, data-packet forwarding, computing header checksums, or implementing network policies.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for improvements in upgrading network components. For example, a major challenge facing embedded devices at the network edge is the inability to seamlessly upgrade the embedded devices. These edge-computing devices can include a control plane that controls a dataplane in which data packets are received at various ports, interacted with in some manner (e.g., filtered, routed, forward, processed through a firewall, etc.), and then transmitted from the various ports, as discussed below.

Generally, upgrading an edge-computing device presents several challenges. First, downtime can result from upgrading the edge-computing device due to device failover and/or route re-convergence. Accordingly, a maintenance window can be scheduled, and the upgrade performed during the maintenance window to allow for the above-noted contingencies. Second, to ensure that the new software or policy does not have negative effects on the network, exhaustive pre-upgrade checks and post-upgrade checks can be performed on the edge-computing device or network component. Third, in case of upgrade failures, a rollback and other contingency plans can be used to rectify the upgrade failures. Fourth, the upgrade can be accompanied by uncertainty about issues in the new version. For example, uncertainty about issues in the new version might not have been identified in quality assurance (QA) checks. In some cases, for example, during the staging/testing phase, the testing environment used to initially verify the new version may be different than the customer's own network on which the new version is ultimately applied (e.g., the production/deployment phase). These differences may be due to unique characteristics of the customer's own network.

The systems and methods disclosed herein address the above-noted challenges by using dual dataplanes, including a primary dataplane and a shadow dataplane. For example, the primary dataplane executes a current version of the software or network policy, and the shadow dataplane executes a new version of the software or network policy. The shadow dataplane is used to perform verification testing of the new version by comparing its performance to that of the current version. Thus, the upgrade can undergo verification testing in the same environment as the current version is operating in (i.e., the customer's own network), thereby eliminating uncertainty about issues in the new version that may not have been identified in QA due to unique characteristics of the customer's own network.

Further, because the new version is verified in the shadow dataplane rather than the primary dataplane, the need for rollback and other contingency plans in case of upgrade failures can be largely mitigated. That is, until the verification testing is complete and the new version is promoted to the primary dataplane, the current version continues to operate in parallel with the new version, and the network functionality continues to be performed by the current version rather than the new version. Then during promotion, which occurs after the new version passes verification testing, the new version can be gradually and gracefully transitioned to assuming the role of the new primary dataplane (i.e., the function of the network device is taken over by the new version). For example, if the new version fails the verification testing, there is no need to rollback to the current version because the current version is still operating to provide the functionality of the edge-computing device, unless and until the new version passes the verification testing. Further, the assurances provided by the pre-upgrade checks and post-upgrade checks can be (largely) integrated into the verification testing. Moreover, because the verification testing occurs in the background and is not disruptive to users, the upgrade can occur at any time rather than during a scheduled maintenance window.

The systems and methods disclosed herein extend many of the advantages of seamless upgrades currently experienced for software as a service (Saas) can be hereby experienced for infrastructure as a service (IaaS) in edge-computing devices and cloud computing environments. For example, in SaaS deployments, the above-noted challenges are largely abstracted away from users, especially the first and third of the above-noted challenges. In SaaS, this is achieved, e.g., by rolling upgrades across multiple containers. Further, in SaaS deployments, the above-noted challenges are largely abstracted away from users by slowly shifting the load from the old version to the new version (e.g., using blue/green deployment) and monitoring the new version. These strategies in SaaS deployments allow continuous integration, continuous deployment (CI/CD) where the SaaS software can be frequently and seamlessly updated in a manner that is invisible to the users.

According to certain non-limiting examples, the systems and methods disclosed herein can achieve CI/CD for infrastructure, edge-computing components (e.g., hardware and software), and embedded edge devices, such that they can be frequently and seamlessly updated in a manner that is non-disruptive to the users (e.g., in ways that are different and/or similar to how this is achieved for SaaS). According to certain non-limiting examples, the systems and methods disclosed herein provide CI/CD in an embedded device that leverages artificial intelligence (AI) to mitigate the four challenges noted above.

According to certain non-limiting examples, the systems and methods disclosed herein use the following four components:
1. A Control Plane Agent, which includes control logic representing the status of the dual dataplanes as well as the latest software and/or policy version(s) available (e.g., the current version and the new version);
2. A Primary Dataplane, which executes/implements the current stable version of software and/or policy;
3. A Shadow Dataplane, which executes/implements an upgrade or new version of software and/or policy; and
4. A Packet Dispatcher, which can provide multiple optional functionalities, including, e.g., a normal mode, a scale-out mode, a verification mode, and a promotion mode.

According to certain non-limiting examples, the systems and methods disclosed herein are configured to operate using the following functionalities, which are performed by the system components:

1. Normal Mode—receives packets (e.g., ingress traffic) and then relays/sends the received packets to the primary dataplane, while the shadow dataplane is maintained in a passive/standby configuration;
2. Scale-out Mode—load balances packets across both dataplanes, e.g., by the packet dispatcher sending different subsets of the received packets to the primary dataplane and the shadow dataplane and using both the primary dataplane and the shadow dataplane to apply the current stable version to the different subsets of the received packets;
3. Verification Mode—receives packets and sends them to the primary dataplane, and additionally sends identical copies to the shadow dataplane, which applies the new version to these identical copies (e.g., in an embodiment that implements the respective dataplanes in data processing units (DPUs), the packet dispatcher may be part of the DPU itself and not a separate component); and
4. Promotion Mode—once verification is complete, the shadow dataplane can take over as the primary dataplane, and a seamless transition occurs due to the graceful migration of data flows from the "Old Primary" to the "New Primary" dataplane.

Examples of such edge-computing devices can include, but are not limited to, software-defined wide area network (SD-WAN) appliances, firewalls, load balancers, routers, switches, data processing units (DPUs), virtual machines that are implemented on one or more processors (e.g., a central processing unit (CPU)) for performing network functions or implementing network policies, or another component or device implemented at a network edge.

According to certain non-limiting examples, the network edge device can include the following three planes: (i) the dataplane, which processes the transit traffic; (ii) the control plane, which sends and receives control signals to monitor and control the transit traffic; and (iii) the management plane, which interacts with the user or the network management system (NMS).

Consider, for example, the operation of a router as an illustrative network edge device. Interfaces, IP subnets, and routing protocols can be configured through management plane protocols, including, e.g., a command-line interface (CLI), Network Configuration Protocol (NETCONF), and a northbound Representational State Transfer (REST) Application Programming Interface (API). The router runs control plane routing protocols (e.g., Open Shortest Path First (OSPF), Enhanced Interior Gateway Routing Protocol (EI-GRP), Border Gateway Protocol (BGP), etc.) to discover adjacent devices and the overall network topology, or to discover reachability information in case of distance/path vector protocols). The router inserts the results of the control-plane protocols into Routing Information Base (RIB) and Forwarding Information Base (FIB). The dataplane software or ASICs, e.g., then use the FIB structures to forward the transit traffic. The management plane protocols (e.g., Simple Network Management Protocol (SNMP)) can then be used to monitor the device operation, its performance, interface counters, etc.

Continuing with the non-limiting example of the network edge device being a router, in addition to controlling the routing protocols, the control plane protocols can also perform numerous other functions including: (i) interface state management (e.g., Point-to-Point Protocol (PPP), Transmission Control Protocol (TCP), and Link Aggregation Control Protocol (LACP)); (ii) connectivity management (e.g., Bidirectional Forwarding Detection (BFD), Connectivity Fault Management (CFM), etc.); (iii) adjacent device discovery (e.g., "hello" mechanisms present in most routing protocols, such as, End System-to-Intermediate System (ES-IS), Address Resolution Protocol (ARP), Internet Protocol version 6 (IPv6_Neighbor Discovery Protocol (NDP), Universal Plug and Play (UPnP) Simple Service Discovery Protocol (SSDP), etc.); (iv) topology or reachability information exchange (IP/IPv6 routing protocols, Intermediate System to Intermediate System (IS-IS) in Transparent Interconnection of Lots of Links (TRILL) and Shortest Path Bridging (SPB), Spanning Tree Protocol (STP), etc.); and (v) service provisioning (e.g., Resource Reservation Protocol (RSVP) for IntServ or Traffic Engineering (TE) based on Multiprotocol Label Switching (MPLS), uPNP SOAP (Simple Object Access Protocol) calls, etc.).

Still continuing with the non-limiting example of the network edge device being a router, in addition to forwarding packets, the dataplane can also perform the following functions: (i) network address translation (NAT) session creation and NAT table maintenance; (ii) neighbor address gleaning (e.g., dynamic Media Access Control (MAC) address learning in bridging, IPv6 Source Address Validation Improvement (SAVI), etc.); (iii) NetFlow or sampled flow (sFlow) accounting; (iv) network access control list (ACL) logging; and (v) Error signaling, such as Internet Control Message Protocol (ICMP).

According to certain non-limiting examples, the management and control planes can be implemented in a central processing unit (CPU) or in a data processing unit (DPU). According to certain non-limiting examples, the data plane could be implemented in numerous ways, including, e.g.: (i) as optimized code running on the same CPU as the control plane; (ii) as code running on a dedicated CPU core (e.g., a dedicated CPU for high-speed packet switching, such as a Linux server); (iii) as code running on linecard CPUs (e.g., a CISCO 7200 series router); (iv) as dedicated processors (e.g., network process units (NPUs), data process units (DPUs), smart network interface cards (SmartNICs), etc.); and (v) as switching hardware (application-specific integrated circuits (ASICs), field programable gate arrays (FPGAs), etc.); and (vi) as switching hardware on numerous linecards.

According to certain non-limiting examples, the dataplane receives and processes the ingress packets. Further, the dataplane can selectively forward packets destined for the router (e.g., Secure Shell (SSH) traffic or routing protocol updates) or packets that need special processing (e.g., IP datagrams with IP options or IP datagrams that have exceeded their TTL) to the control plane.

According to certain non-limiting examples, the management ports on some devices (e.g. data center switches) can be connected directly to a control-plane CPU and thus bypass a switching ASIC.

According to certain non-limiting examples, the control plane can pass outbound packets to the dataplane, or use its own forwarding mechanisms to determine the outgoing interface and the next-hop router (e.g., when using the local policy routing).

A computer network is a geographically distributed collection of nodes interconnected by communication links and segments for transporting data between end nodes, such as personal computers, cellular phones, workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to forward data from one network to another.

FIG. 1A is a schematic block diagram of a non-limiting example of a computer network 100 that includes various nodes/devices, such as a plurality of routers/devices interconnected by links or networks. For example, customer edge (CE) routers 110 may be interconnected with provider edge (PE) routers (e.g., PE-1 120*a*, PE-2 120*b*, and PE-3 120*c*) to communicate across a core network, such as an illustrative network backbone 130. For example, the routers (e.g., CEs 110, PEs 120) may be interconnected by the public Internet, a multiprotocol label switching (MPLS), or a virtual private network (VPN). Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN utilizing a Service Provider network, via one or more links exhibiting very different network and service level agreement characteristics.

According to certain non-limiting examples, a given customer site may fall under any of the following categories:
1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.
2.) Site Type B: a site connected to the network using two MPLS VPN links (e.g., from different Service Providers) using a single CE router, with potentially a backup link (e.g., a 3G/4G/5G/LTE connection). A site of type B may itself be of different types:
2a.) Site Type B1: a site connected to the network using two MPLS VPN links (e.g., from different Service Providers), with potentially a backup link (e.g., a 3G/4G/5G/LTE connection).
2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 120*b* and a second CE router 110 connected to PE-3 120*c*.

Figure 1B:
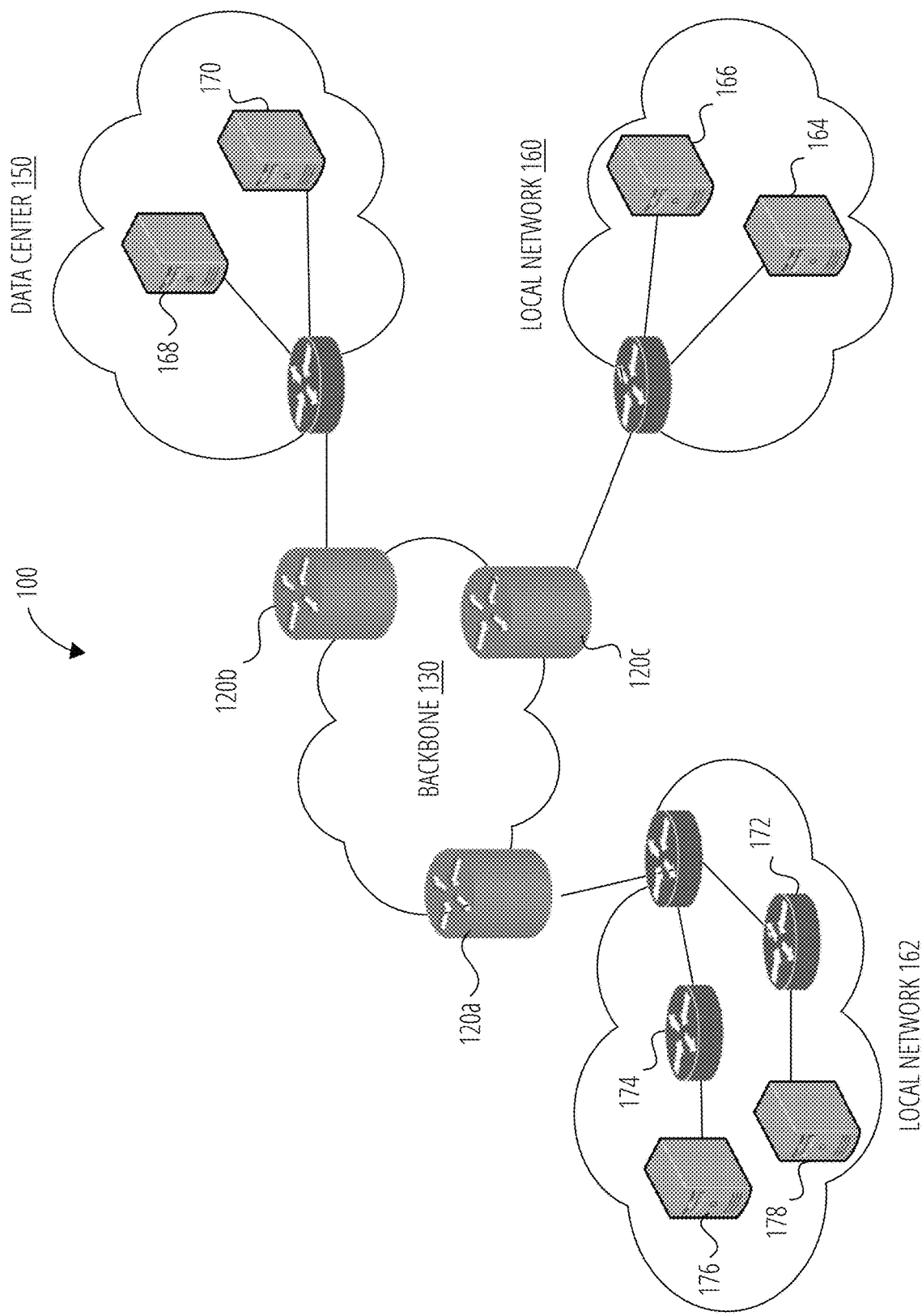
FIG. 1B illustrates a block diagram of a second example of the network, in accordance with certain embodiments.

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160 and 162 that include devices/nodes 172, 174, 176, and 178 and devices/nodes 164 and 166, respectively, as well as a data center/cloud environment 150 that includes servers 168 and 170. Notably, local network 160, local network 162, and data center 150 can be located in different geographic locations.

Server 168 and server 170 can include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often deployed on what are referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for devices/nodes 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QOS), security, network management, and traffic engineering extremely challenging, to mention a few.

Figure 2:
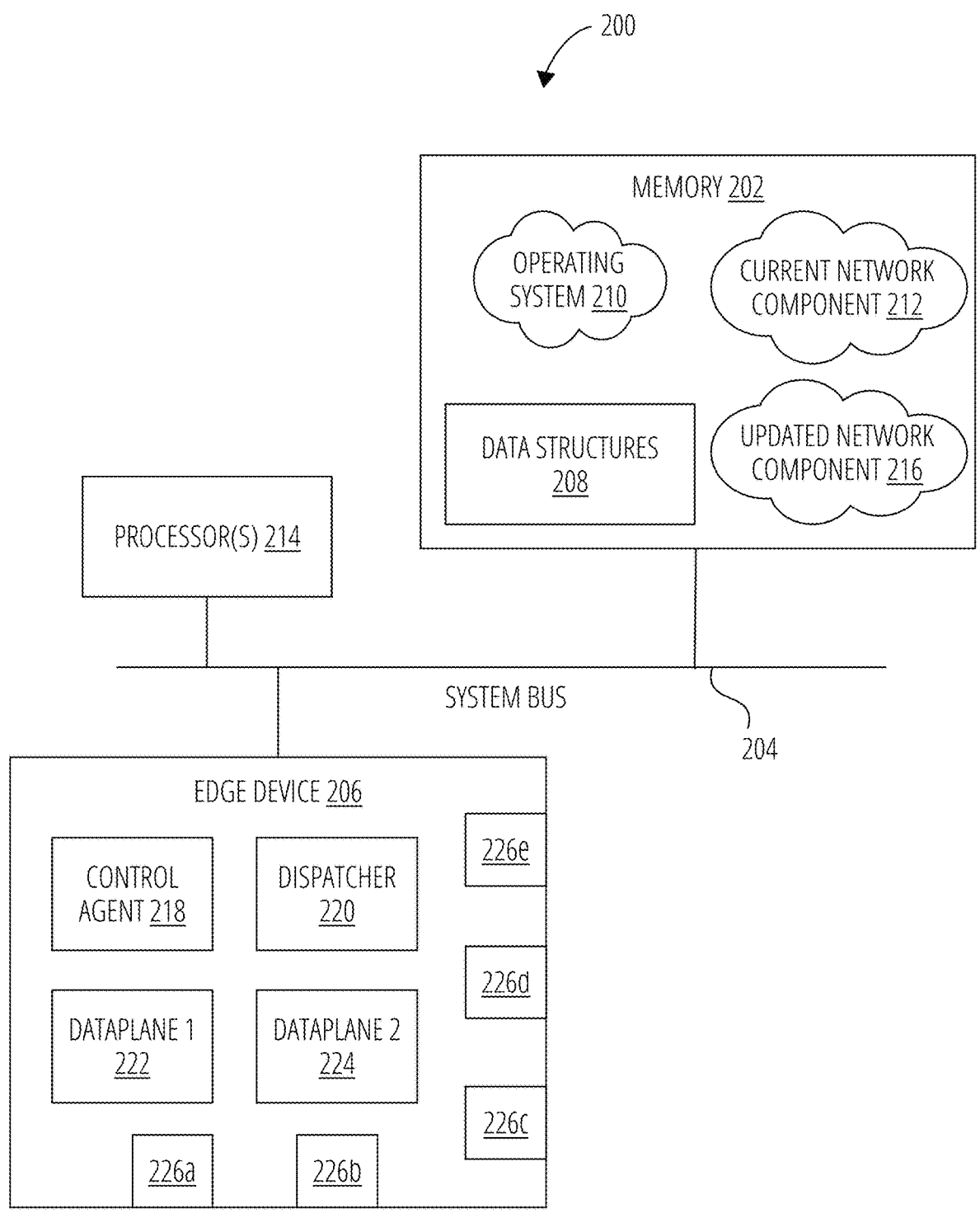
FIG. 2 illustrates a block diagram of a network device, in accordance with certain embodiments.

FIG. 2 is a schematic block diagram of an example node/device 200 (e.g., an apparatus) that may be used with one or more embodiments described herein, e.g., as any of the computing devices shown in FIG. 1A and FIG. 1B, the device 200 may also be any other suitable type of device depending upon the type of network architecture in place, such as IoT nodes, etc. Device 200 can include one or more edge devices 206, one or more processor(s) 214, and a memory 202 interconnected by a system bus 204.

The edge device 206 can include the mechanical, electrical, and signaling circuitry for communicating data over physical links coupled to the network 100. The edge device 206 can be configured to transmit and/or receive data using a variety of different communication protocols. the edge device 206 can also be used to implement one or more virtual network interfaces, such as for virtual private network (VPN) access, known to those skilled in the art. The edge device 206 can be implemented as software executed on a central processing unit (CPU), such as a virtual machine like a Berkley packet filter (BPF) or extended BPF (eBPF) that is configured to implement a network policy, for example. Alternatively or additionally, The edge device 206 can be implemented as a separate piece of hardware (e.g., a data processing unit (DPU), a graphics processing unit (GPU), a smart network interface card (smartNIC), a network interface controller, an application-specific integrated circuit (ASIC), field programable gate array (FPGA), or other device/circuitry configured to perform the function of a network component).

The edge device 206 can be configured to provide one or more network functions, including, e.g., data-packet filtering, load balancing, packet screening, pattern detection for cybersecurity threats, malware detection, firewall protection, data-packet routing, data-packet switching, data-packet forwarding, computing header checksums, or implementing network policies. According to certain non-limiting examples, the edge device 206 can be an embedded device at the network edge. The edge device 206 can include (or be part of) a software-defined wide area network (SD-WAN) appliance, a firewall, or a load balancer, for example.

Moreover, the systems and methods disclosed herein can be used with any edge device 206 that includes a dataplane that can be intermittently updated to a new version.

The edge device 206 can include a dataplane, a control plane, and a management plane, as discussed above. Further, instructions implementing the control plane and the management plane can be stored and/or executed in the processor(s) 214. Additionally or alternatively, the edge device 206 can include processors or circuits that implement one or more functions of the control plane and the management plane. The edge device 206 can include a series of ports (e.g., port 1 226a, port 2 226b, port 3 226c, port 4 226d, and port 5 226e). The edge device 206 can also include a control agent 218, a dispatcher 220, a dataplane 1 222, and a dataplane 2 224.

Memory 202 can include a plurality of storage locations that are addressable by the processor(s) 214 and the edge device 206 for storing software programs and data structures associated with the embodiments described herein. Memory 202 can include various data structures 208 and can include instructions for executing the operating system 210, the current network component 212, and the updated network component 216. The processor(s) 214 can include logic adapted to execute the software programs and manipulate the data structures 208. An operating system 210 (e.g., the Internetworking Operating System, or IOS®, of Cisco Systems, Inc., another operating system, etc.), portions of which can be in memory 202 and executed by the processor(s), functionally organizes the node by, inter alia, invoking network operations in support of software processors and/or services executing on the device.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
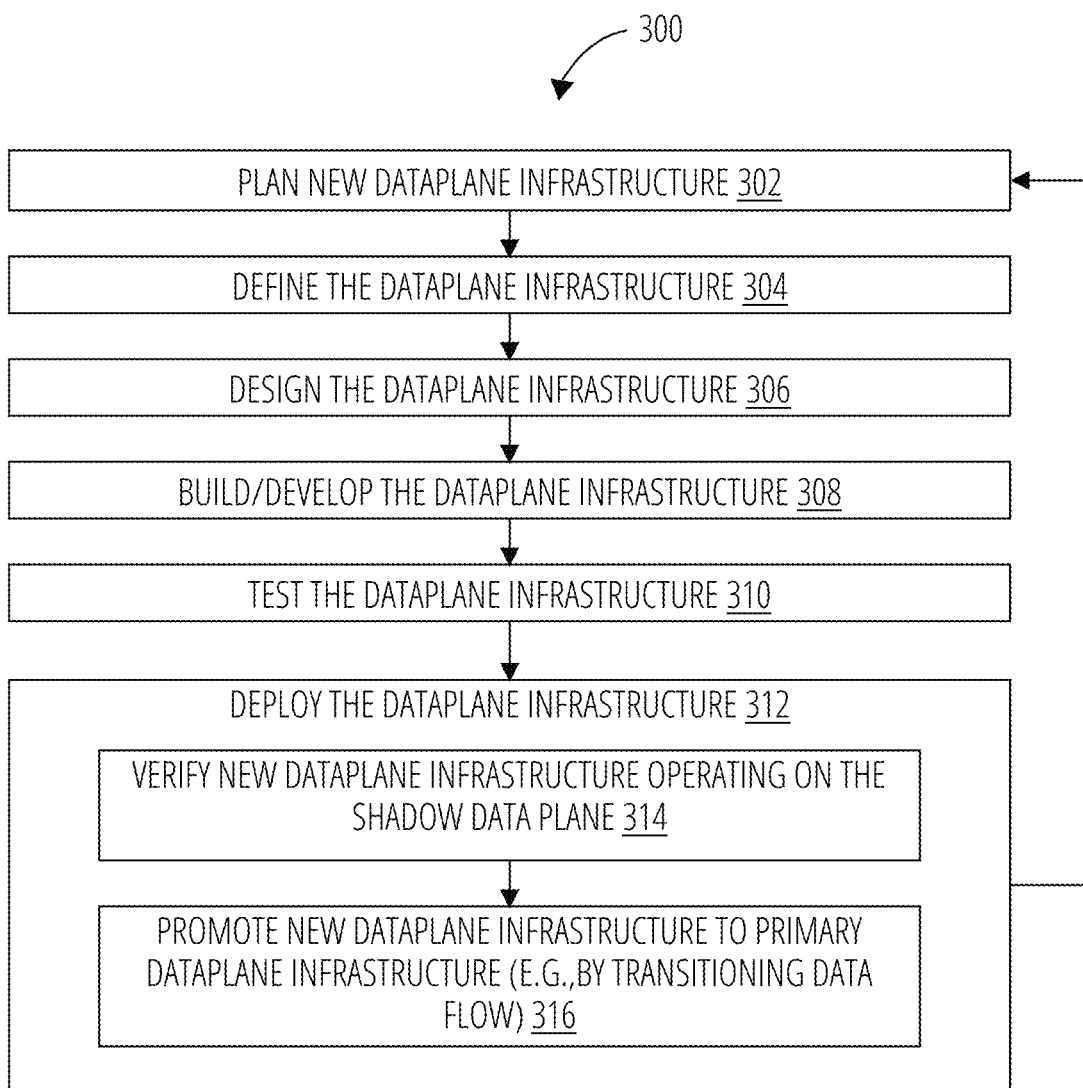
FIG. 3 illustrates a flow diagram for an example of a method of implementing a software development lifecycle (SDLC), in accordance with certain embodiments.

FIG. 3 illustrates an example of method 300 for a software development life cycle (SDLC). Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements method 300 may perform functions at substantially the same time or in a specific sequence.

Method 300 provides a structured process to enable high-quality, low-cost dataplane development in a short period. Method 300 can produce a dataplane infrastructure that meets customer expectations with minimal interruption.

According to some examples, in step 302, the method includes planning new dataplane infrastructure.

According to certain non-limiting examples, step 302 includes planning and requirement analysis. Requirement analysis can be performed by the senior members of the team with inputs from the customer, the sales department, market surveys, and domain experts in the industry. This information can be used to plan the basic project approach based on studies in the economical, operational, and technical areas.

According to some examples, in step 304, the method includes defining the dataplane infrastructure at step 304.

According to certain non-limiting examples, upon completion of the requirement analysis, the product requirements can be defined and documented. Further, these product requirements can be approved by the customer or the market analysts. This can be done using a software requirement specification (SRS) document which consists of all the product requirements to be designed and developed during the project life cycle.

According to some examples, in step 306, the method includes designing the dataplane infrastructure at step 306.

According to certain non-limiting examples, the SRS is used as the reference for product architects to come out with the best architecture for the product to be developed. Based on the requirements specified in SRS. According to certain non-limiting examples, more than one design approach can be proposed for the product architecture is proposed and documented in a DDS-Design Document Specification.

This DDS is reviewed by various stakeholders and a preferred design approach is selected based on various selection criteria (e.g., based on various parameters such as risk assessment, product robustness, design modularity, budget, and time constraints). A design approach defines the architectural modules of the product along with its communication and data flow representation with the external and third-party modules (if any).

According to some examples, in step 308, the method includes building/developing the dataplane infrastructure at step 308.

According to certain non-limiting examples, in step 308 the development is performed and the product is built. The programming code is generated as per DDS during this step. Developers follow the coding guidelines defined by their organization and programming tools like compilers, interpreters, debuggers, etc. are used to generate the code. Different high-level programming languages such as C, C++, Pascal, Java and PHP are used for coding.

According to some examples, in step 310, the method includes testing the dataplane infrastructure at step 310.

According to certain non-limiting examples, step 310 can include parts of all stages of the SDLC cycle, and can thus be viewed as a subset of all the stages of the SDLC model. Further, some testing activities can be integrated with other stages of the SDLC method 300. Once a code commit is ready, testing can proceed by provisioning the code commit in a staging environment that is intended to be representative of how the new version will be used in practice. Then, testing proceeds by measuring various signals to determine that the product/new version functions as desired. Generally, step 310 can include testing the product/new version for defects, bugs, or security vulnerabilities, and then reporting, tracking, fixing, and retesting the defects, bugs, or security vulnerabilities, until the product reaches the quality standards and passes a quality assurance (QA) process.

According to some examples, in process 312, the method includes deploying the dataplane infrastructure at process 312. Process 312 can include step 314 and step 316. In process 312, the new version/product can be deployed by provisioning it in a production environment (e.g., the customer's own network) and performing additional testing in this environment to ensure that the new version/product by measuring various signals to determine that the product/new version functions as desired.

Figure 4:
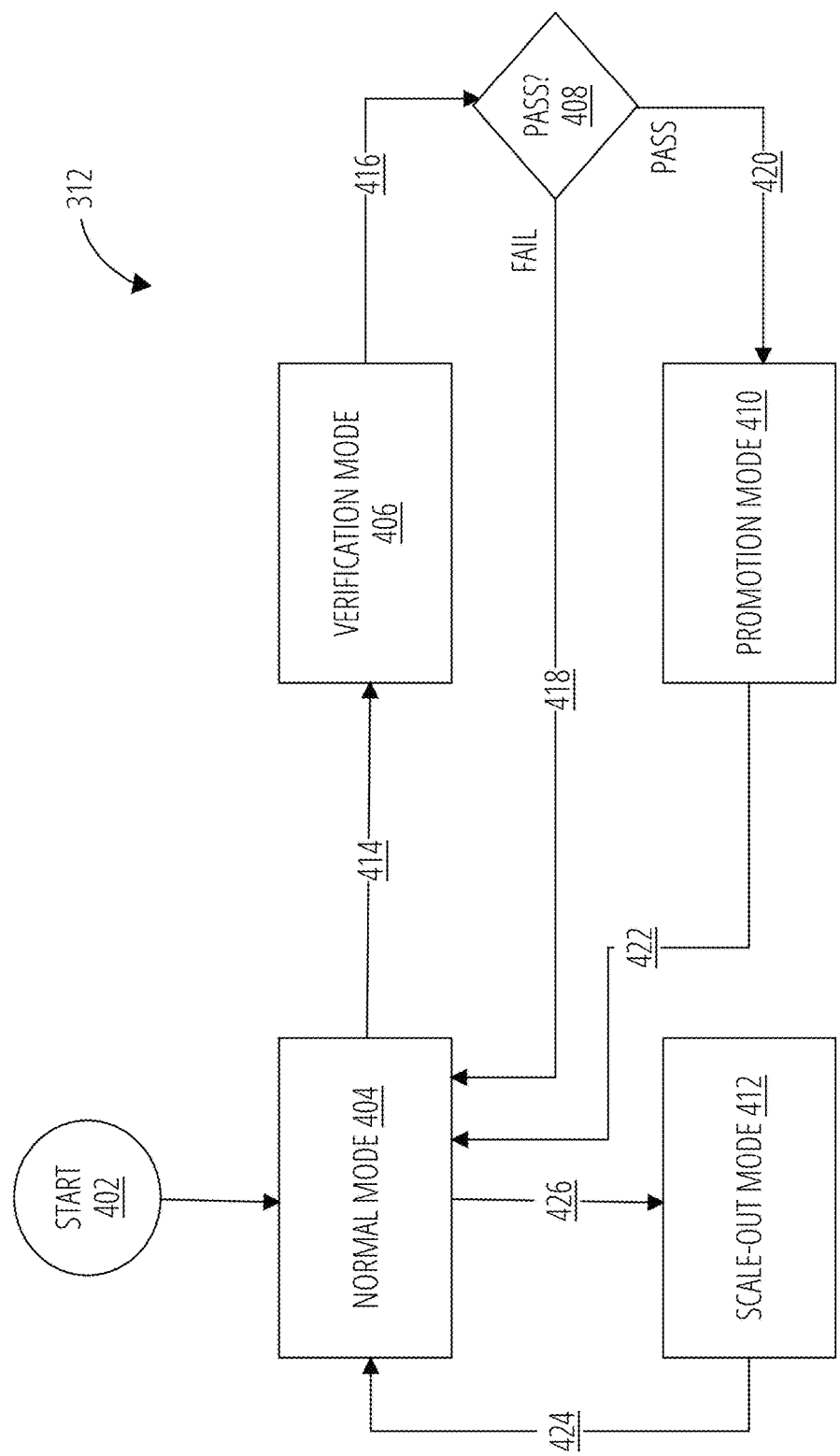
FIG. 4 illustrates a state diagram for an example of a step for deploying a new software/policy version using dual dataplanes, in accordance with certain embodiments.

According to some examples, in step 314, the method includes verifying new dataplane infrastructure operating on the shadow data plane at step 314. According to certain non-limiting examples, step 314 can be performed using the verification mode 406 and the decision block 408, which are illustrated in FIG. 4 and are described below with reference to FIG. 4.

According to some examples, in step 316, the method includes promoting new dataplane infrastructure to primary dataplane infrastructure (e.g., by transitioning the data flow from the previous primary dataplane to the previous shadow dataplane, which becomes the new primary dataplane). According to certain non-limiting examples, step 316 can be performed using the promotion mode 410, which is illustrated in FIG. 4 and is described below with reference to FIG. 4.

According to certain non-limiting examples, the verification process that is disclosed herein using the shadow dataplane can replace previous methods of verification testing. Alternatively, the verification process that is disclosed herein can be combined with, rather than replace, previous methods of verification testing (e.g., step 310) that exist as a normal course of the Software Development Lifecycle (SDLC). For example, code commits can be continuously integrated and tested in a staging environment, prior to the use of the shadow-dataplane-based verification process in a production environment. Once staging-phase testing is complete, the code can merged into the production branch and pushed into production. For example, the shadow-dataplane-based verification process can provide a unique non-disruptive way as the last stage of the continuous integration, continuous deployment (CI/CD) promotion pipeline.

Failures (e.g., defects, bugs, or vulnerabilities) detected in the production/deployment testing (i.e., during the Verification Mode) can indicate a field escape of a bug that was missed during the QA process (e.g., the testing in step 310). Thus, the production/deployment testing (i.e., during the Verification Mode) provides a way to prevent the bug from negatively impacting production by doing out-of-band verification within the actual production environment (e.g., the customer's own network), but in a manner that is not disruptive and/or is invisible to the customer (e.g., without the disruption of software rollbacks).

Failures (e.g., defects, bugs, or vulnerabilities) detected in the production/deployment testing can be treated as field escapes. Although verification-mode failures do not negatively impact production, they can, however, incur other costs associated with QA field escapes (e.g., delay in getting new code to production, need to reverse engineer the failure, need to augment QA testing in staging to ensure this type of escape does not reoccur). Thus, the Verification Mode failures can be treated as field escapes by automatically generating bug reports for the team to address in both the software-development phase and staging-test phase (e.g., step 308 and step 310).

FIG. 4 illustrates a non-limiting example of process 312. According to certain non-limiting examples, step 302 goes from start 402 to the normal mode 404.

In normal mode 404, packets are simply sent through the primary dataplane and processed as normal. The shadow dataplane is in standby, waiting in case a new software and/or policy that needs verification arrives. Generally, there is no way to predict when the new software and/or policy that needs verification will arrive.

In scale-out mode 412, the idle resources in the shadow dataplane can be put to use for load balancing. In the absence of a shadow dataplane, a mechanism for scale-out of the network edge device is to leverage resources along the application path (e.g., DPU in the server+DPU in the switch). However, there may be cases where a device is overloaded and there is no way to shift load around in the immediate term. When this is the case, additional resources may become temporarily available by switching to scale-out mode 412 to take advantage of the shadow dataplane. Scale-out mode 412 is initiated by a scale-out request 426, and then terminated when there is no longer a need for additional resources, resulting in signal 424 indicating that the normal capacity threshold is maintained.

According to certain non-limiting examples, in scale-out mode 412, any verification testing currently being processed is canceled, and a pause is put on accepting verification testing. The system engages both dataplanes as Active/Active (i.e., the primary dataplane is in an active state and the shadow dataplane is in an active state, rather than standby). Both dataplanes implement a current version of the software/policy. The packet dispatcher load balances packets across the active dataplanes to use all available capacity. For example, in a pure x86 or Advanced RISC Machine (ARM) system, this can be implemented as another pipeline to process packets, spreading the workload across more cores. In a system with DPUs, e.g., this means taking advantage of the additional hardware capacity on the DPUs.

According to certain non-limiting examples, in verification mode 406, packets are mirrored through two versions of the software and/or policy, which are running concurrently. The primary dataplane can be agnostic to the fact that the system is in verification mode and simply functions as it normally would. The shadow dataplane implements the new software and/or policy, and the shadow dataplane drops packets at the end of the pipeline rather than transmitting them. That is, both the primary dataplane and the shadow dataplane receive the exact same packets, making it possible to perform a direct comparison between the performance of the current and new versions of the software/policy. Further, this comparison is performed using the customer's actual traffic, and this comparison is performed transparently, without any impact on the execution of the network.

As part of (or separate from) the verification mode 406, the decision block 408 includes checks to determine, after a specified testing interval, whether the new version passed or failed the verification test(s). If the verification fails, the fail signal 418 indicates that the shadow dataplane has not been authorized to take over as the primary dataplane. The system reverts to normal mode 404 without passing through promotion mode 410, and the system sends a message to the controller indicating the cause of the failure. A newer policy or software version is then developed and the verification mode 406 is reinitiated using the newer policy or software version. If verification testing passes, the system generates a signal of pass 420 and moves to promotion mode 410.

Once verification mode 406 is complete and the new version has passed the verification, promotion mode 410 is initiated to promote the shadow dataplane to the primary dataplane. Preferably, this promotion is performed gracefully to minimize disruption to the running system. Further, this promotion can be performed gradually, in case a rollback becomes required due to there being any issues that were missed during verification.

According to certain non-limiting examples, in promotion mode 410, the shadow dataplane becomes the "primary pending" dataplane and the packet dispatcher begins forwarding all new flows to the primary pending dataplane. Once these flows are observed to flow normally, existing flows are gracefully migrated from the primary dataplane to the primary pending dataplane until all flows are transiting through the primary pending dataplane. At this point, the primary dataplane moves to the shadow dataplane, and the primary pending dataplane to the primary dataplane. Then the signal for the primary and shadow role exchange 422 is triggered, sending the state machine representing process 312 back to normal mode 404.

Returning to verification mode 406, verification can be predicated on assessing the difference in behaviors of two versions of network software and/or network policies. In many cases, a comparison between the two versions is more involved than merely observing that the performance of the new version matches the performance of the current version. For example, the new version can be expected to perform differently than the current version. For example, the new version might be intended to improve performance in certain aspects relative to the current version. Thus, the comparison between the performances of the two versions can be informed regarding expected differences in performance due to improvements integrated into the new versions, and, in anticipation of these differences, the comparison can set out criteria for the verification testing that account for the expected differences in performance.

In one case that exemplifies a simple verification, the new version of the software is a minor revision to the current software that is limited to optimizing the pipeline to improve performance. In this case, verification can be straightforward because the expected result of the new version of the software is that the same number of packets are received and transmitted, the same policies are matched, the CPU and memory usage are the same or lower, the latency of packets transiting the dataplane is reduced and the effective throughput increased. Thus, basic heuristics can be used to determine whether the new version is an improvement relative to the current version, which would signify a successful verification.

In other cases, however, verification is not as simple as in the above example. In such cases, new versions of software and policy can be accompanied by metadata that can inform the system how to interpret the results of the comparison between performances of the current and new versions to establish predefined criteria for verification.

In these more complicated/non-trivial verification cases, verification criteria can be established for various aspects of the performance comparison. For example, to determine that the new version of the software will not disrupt the network, various different factors can be considered for the metrication of the performance when executing a firewall dataplane, including, e.g., CPU performance, memory usage, packet latency, and traffic volume. For example, the predefined verification criteria can include metrics related to changes in the CPU usage, including, e.g., the minimum CPU usage, the maximum CPU usage, and the average CPU usage. Further, the predefined verification criteria can include metrics related to o changes in memory usage, including, e.g., the minimum memory usage, the maximum memory usage, the average memory usage, and memory growth over the verification period. Additionally, the predefined verification criteria can include metrics related to changes in the packet latency, including, e.g., the average time it takes packets to traverse the dataplane.

In addition to the above performance metrics, the predefined verification criteria can include various traffic-volume metrics. These traffic-volume metrics can include, e.g., the total number of packets processed, the number of dropped packets, and the number of packets that are transmitted (i.e., transmitted from the ports to other network devices). In certain verification cases, it is anticipated that traffic volume should be identical at egress, between the primary and shadow dataplanes. For example, if N packets arrived and K packets were dropped due to policy, L packets should be transmitted at the end. For verification to be precise, the exact same number of packets (e.g., N packets) can be ensured on both dataplanes. The exact same number of packets can be ensured, e.g., by sending an inline control packet that signals the start and end of verification. This ensures that both dataplanes are operating on the same N.

Whereas traffic volume should be identical at egress for cases in which the policies or other aspects of the processing do not change the number of dropped packets, in other cases the number of dropped packets can change, but often the number of dropped packets will change in predictable ways, which can be communicated via the accompanying metadata to generate traffic-volume metrics that are indicative of the predicted changes. That is, some versions of software may alter the number of dropped packets (e.g., above K value) for valid reasons.

For instance, in the case that the current version of the software does not properly enforce dropping packets with a specific Internet Control Message Protocol (ICMP) code, but the new version does properly enforce dropping packets with the specific ICMP code. In this case, the new version can be expected to drop more packets than the current version. The percentage change in the number of dropped packets can be learned during the staging phase, and then this learned value can be included in the metadata. When comparing the performances of the primary and shadow dataplanes during the verification mode 406, which occurs during the production phase of the SDLC, the metadata can be used to predict a range of acceptable values for the number of dropped packets for the shadow dataplane relative to the primary dataplane, and this predicted range can be one of the verification criteria.

The use of metadata to predict values for verification criteria is not limited to traffic volume, as would be understood by a person of ordinary skill in the art. Generally, verification metadata can be used as part of the upgrade to communicate/train the system about what is going to be different in the new version of the software/policy. For example, the verification metadata indicates what is expected to be different in the new version of the software/policy, such that, in verification mode 406, the expected differences are not treated as verification failures. That is, the verification metadata can inform the decision regarding whether the new version of the software/policy is good (i.e., passes verification testing). The verification metadata can be generated in various ways, including, e.g., by being hard coded by a network operations center (NOC) engineer, a programmer, or a software developer; generated during in-house testing or staging-phase testing; based on product specification documents or expected changes, etc. The system can then use the verification metadata to predict how the new version should perform relative to the current version in order to pass verification testing. For example, the system can include an artificial intelligence (AI) engine that has been trained to predict these differences between the respective performances of the current and new versions of the software/policy.

For example, the AI engine can effectively replace the NOC engineer (i.e., the person who would typically perform the firewall upgrade) for production testing by implementing the verification criteria for verification mode 406 based on the verification metadata.

For example, in the SDLC, a NOC engineer could perform the pre-production testing, push the new version of the software, and then do the post-upgrade testing. The NOC engineer might use a spreadsheet listing various values for the current version and the new version, and these can be, e.g., the CPU usage, memory usage, and the number of packets. The spreadsheet might further list changes in policies, and so forth, and, then by comparing these sets of values for current and new versions, the NOC engineer applies their judgment two to make sure the values for the current and new versions are either the same or the differences are expected/justified.

The AI engine can essentially replace the NOC engineer and can automate the above process by using the verification metadata to predict what differences are expected/justified. The AI engine can be integrated with the control-plane agent 508, and the AI engine can be trained to predict based on various values in the verification metadata what metrics the new version should meet when operating properly to pass the verification testing.

In addition to the above discussion, policy verification also include some unique aspect with respect to the verification criteria. For example, policy verification can be distinct from software verification because, in many cases, the version of the policies is expected to change the behavior of the system. Thus, the verification criteria for a new version of the policies can include metrics quantifying/indicating whether the new policy would negatively impact user traffic and whether the new policy effectively delivers the intended outcome. For example, the verification criteria can include one or more metrics quantifying whether the new policy has exposed some deficiency in the system that would negatively impact user traffic (e.g. performance degradation due to high CPU usage). Additionally, the verification criteria can include one or more metrics that assist the administrator in determining whether the policy effectively delivers the outcome that the administrator instituted the new policy to achieve.

Figure 5:
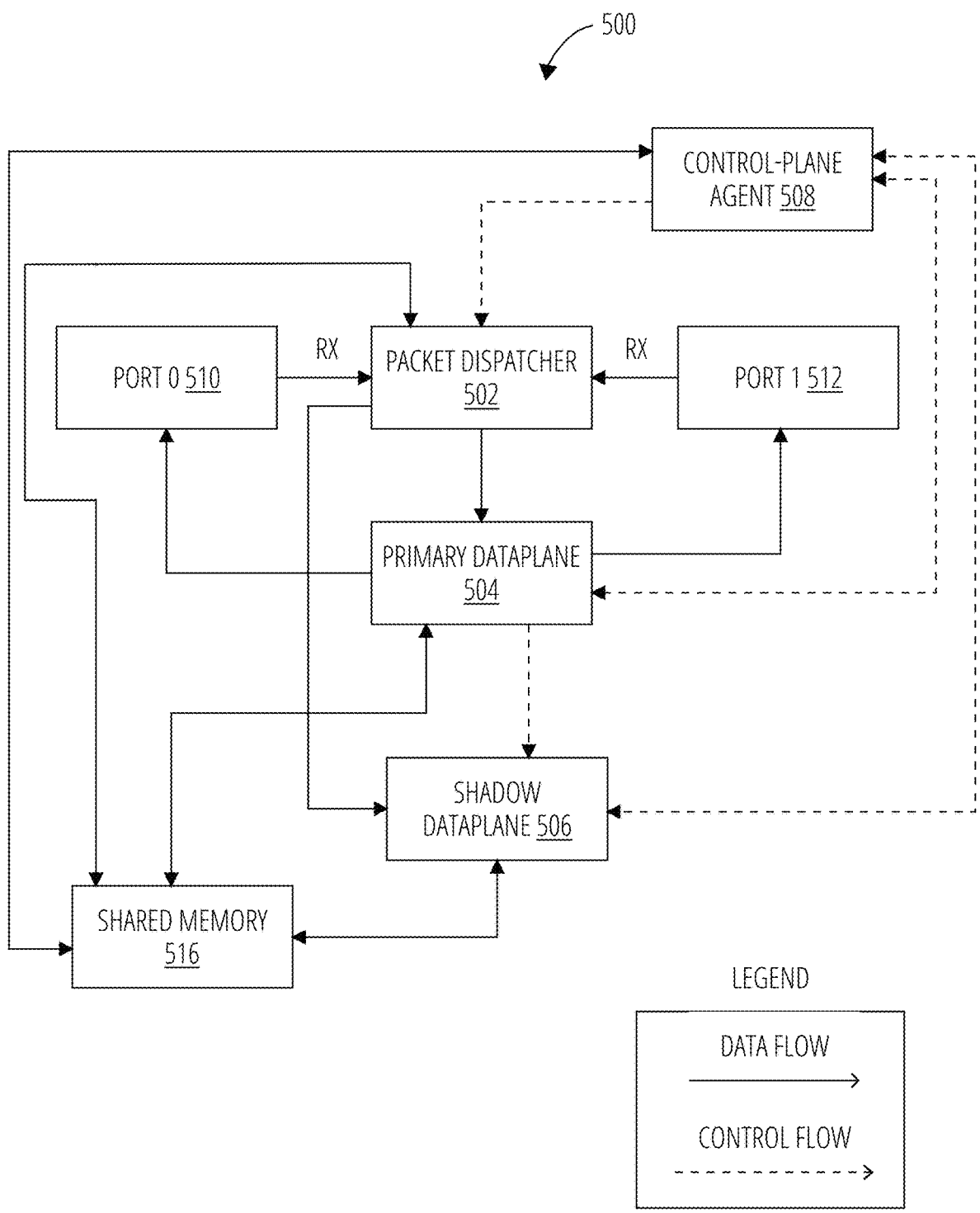
FIG. 5 illustrates a block diagram of a first example of implementing dual dataplanes in data processing units (DPUs), in accordance with certain embodiments.

FIG. 5 illustrates a non-limiting example of a dual dataplane architecture 500 for a network appliance. Another dual dataplane architecture for use with DPUs (i.e., the DPU dual dataplane architecture 600) is presented in FIG. 6. In a physical or virtual machine that does not have access to DPUs, the systems and methods disclosed herein provide the ability to run concurrent dataplanes in parallel in order to support the dual dataplane model of CI/CD upgrades with inline validation.

As illustrated in FIG. 5, ingress packets are received through port 0 510 and port 1 512 to the packet dispatcher 502, and then the packet dispatcher 502 selects which of these data packets to direct to the primary dataplane 504 and the shadow dataplane 506. For example, in the verification mode 406 the packets can be mirrored such that identical replicas are sent to both dataplanes. In contrast, in the scale-out mode 412, different sets of data packets can be directed to each of the dataplanes. In FIG. 5 only the packets from the primary dataplane 504 are transmitted to port 0 510 and port 1 512, which is reflective of the normal mode 404 and the verification mode 406. In the scale-out mode 412, however, both dataplanes will process and transmit packets from the network component/device implemented using the dual dataplane architecture 500. Additionally, throughout the promotion mode 410, the "New Primary" dataplane (i.e., shadow dataplane 506) can gracefully transition from not sending packets to being the only of the two dataplanes that is sending packets to the ports. Control signal flow between the control-plane agent 508 and each of the packet dispatcher 502, the primary dataplane 504, and the shadow dataplane 506. Further, control signal can flow from the primary dataplane 504 to the shadow dataplane 506.

The dual dataplane architecture 500 includes a shared memory 516 that can be accessed by respective components of the dual dataplane architecture 500, including, e.g., being accessed by the packet dispatcher 502, primary dataplane 504, shadow dataplane 506, and control-plane agent 508. The shared memory 516 enables the dataplanes to operate as stateless as possible by storing state-type information in the shared memory 516, which is accessible by all components of the system. This can allow the packet dispatcher 502 to monitor the performance of both dataplanes. Further, these features can also allow flows to be migrated from one dataplane to the other since the state is isolated.

The dual dataplane architecture 500 uses several functions to realize the various modes. For example, the network devices can be deployed on high availability (HA), and, more particularly, two modes of high availability (HA) can be used: (i) active/standby HA between the dataplanes (e.g., when in the Normal Mode active/standby HA is used with the primary dataplane in active HA and the shadow dataplane in standby HA) and (ii) active/active HA between the dataplanes (e.g., when in the Scale-out Mode active/active HA is used with both the primary dataplane and the shadow dataplane in active HA).

For example, when the network device is a firewall, operating in active/standby HA entails that the first firewall processes all the traffic, and the second firewall, which is a clone of the first firewall, is waiting to take over. Continuing the non-limiting firewall example, operating in active/active HA entails both the first firewall and the second firewall are active (i.e., processing traffic). For example, half the traffic can be sent to the first firewall and the remaining half the traffic can be sent to the second firewall, thereby leveraging all of the compute on that system.

Another function enabled by the dual dataplane architecture 500 is mirroring the packets to the shadow dataplane by sending replicas of the packets through both dataplanes. Because replicas of the packets are used through both dataplanes, this function is used in the verification mode to allow an apples-to-apples type comparison for verification testing between the current version of the network-device software, which is operating on the shadow dataplane. Based on this comparison, the system can tell if the new network software (or new network policy) satisfies predefined verification criteria and passes the verification test to replace the old network software (or old network policy).

Another function enabled by the dual dataplane architecture 500 is gracefully transitioning flows from the "Old Primary" to "New Primary" dataplane (e.g., in the promotion mode).

These functions are enabled (in part) by: (i) keeping the dataplanes as stateless as possible and (ii) storing state-type information in a shared memory that is accessible by all components of the dual dataplane architecture 500. This allows the packet dispatcher 502 to monitor the performance of both dataplanes. This also allows flows to be migrated from one dataplane to the other because the state is isolated.

Additionally, the dataplanes can share additional components. For example, the dataplanes can share a common random number generator. Consider the case in which the dataplanes are used when performing men-in-the-middle interception of TLS sessions. In this case, a secret key is generated, and the key should be the same value for both dataplanes so that the traffic can be mirrored through both data planes. That is, the dataplanes need to generate the identical key, so that they can understand the resulting response in the TLS session. The keys are generated using a random number from a random number generator. Accordingly, by using the same random number from a common random generator, the dataplanes can generate the same unique key for TLS or similar processes.

Figure 6:
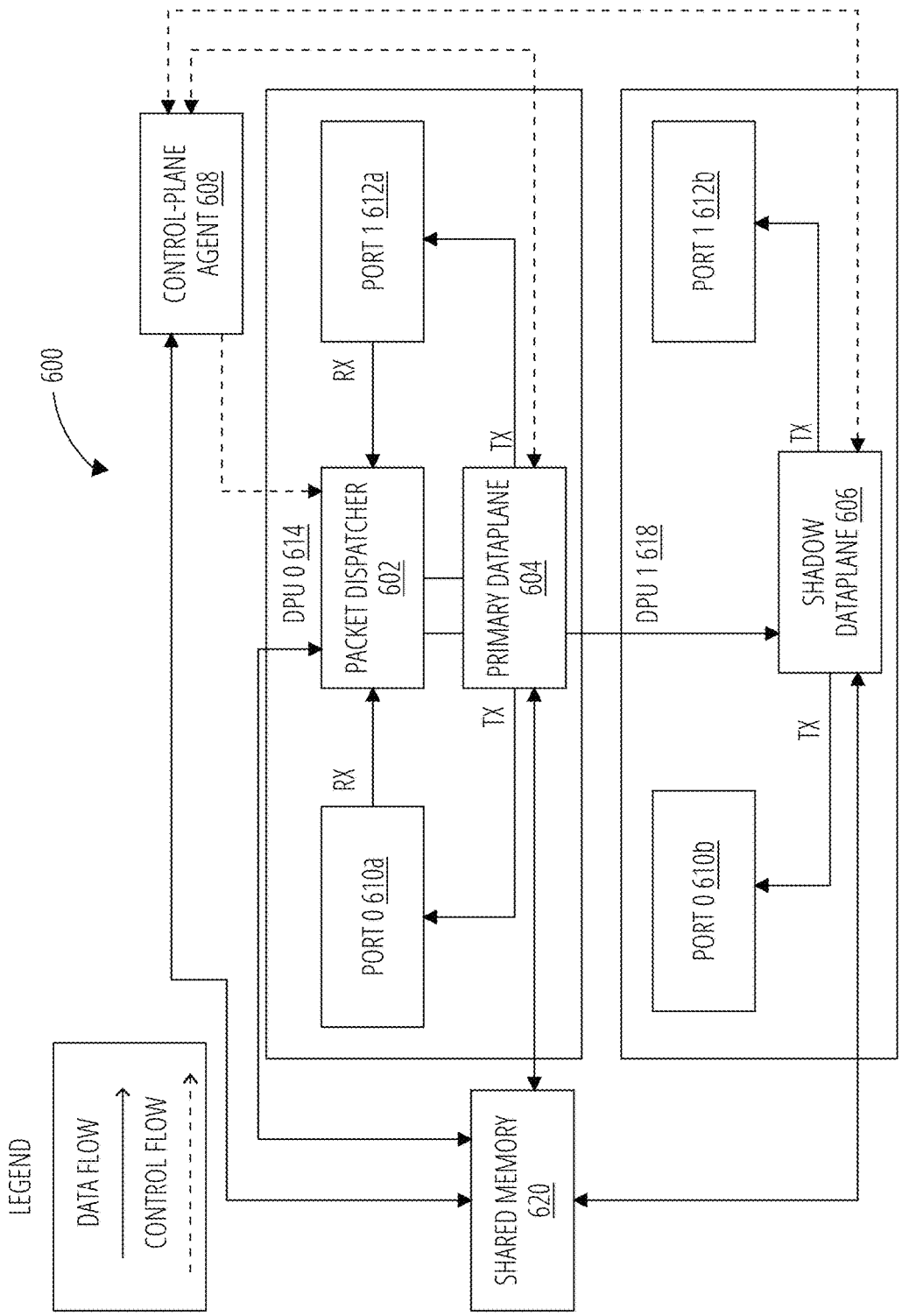
FIG. 6 illustrates a block diagram of a second example of implementing dual dataplanes in data processing units (DPUs), in accordance with certain embodiments.

FIG. 6 illustrates a non-limiting example of a DPU dual dataplane architecture 600. To realize the various modes (e.g., normal mode 404, verification mode 406, promotion mode 410, and scale-out mode 412), the DPU dual dataplane architecture 600 uses the same (or similar) functions as the dual dataplane architecture 500 to realize the various modes.

For example, the network devices can be deployed on high availability (HA), and, more particularly, two modes of high availability (HA) can be used: (i) active/standby HA between the dataplanes 6 (e.g., when in the Normal Mode active/standby HA is used with the primary dataplane in active HA and the shadow dataplane in standby HA) and (ii) active/active HA between the dataplanes (e.g., when in the Scale-out Mode active/active HA is used with both the primary dataplane and the shadow dataplane in active HA).

Descriptions of the functions and how they enable the respective modes of the DPU dual dataplane architecture have been provided above in reference to FIG. 5, and therefore these descriptions are not repeated here. Some differences between the dual dataplane architecture 500 and the DPU dual dataplane architecture 600 are noted here. Generally, in the promotion mode, the graceful transition of packet flows from the "Old Primary" dataplane to the "New Primary" dataplane is enabled by keeping the dataplanes as stateless as possible and the storing state is provided in a shared memory that is accessible by all components of the system, thereby allowing the dispatcher to monitor the performance of both dataplanes. Further, these features can also allow flows to be migrated from one dataplane to the other since the state is isolated.

The DPU dual dataplane architecture 600 includes a shared memory 620 that can be accessed by respective components of the DPU dual dataplane architecture 600, including, e.g., being accessed by the packet dispatcher 602, primary dataplane 604, shadow dataplane 606, and control-plane agent 608. The shared memory 620 enables the dataplanes to operate as stateless as possible by storing state-type information in the shared memory 620, which is accessible by all components of the system. This can allow the packet dispatcher 602 to monitor the performance of both dataplanes. Further, these features can also allow flows to be migrated from one dataplane to the other since the state is isolated.

In DPU environments, however, it may not be possible for the dataplanes to run entirely stateless, e.g., when leveraging hardware acceleration. To address this difference, during the promotion mode, session re-establishment may be used, resulting in a truly graceful promotion mode taking longer in the DPU dual dataplane architecture 600 than in the dual dataplane architecture 500.

As illustrated in FIG. 6, ingress packets are received through port 0 610a and port 1 612a of DPU 0 614, and then the ingress packets are transmitted from the respective ports to the packet dispatcher 602. The packet dispatcher 602 then selects which of these data packets to direct to the primary dataplane 604 and which to the shadow dataplane 606. For example, in the verification mode 406 the packets can be mirrored such that identical replicas are sent to both dataplanes. In contrast, in the scale-out mode 412, different sets of data packets can be directed to each of the dataplanes. In FIG. 6 only the packets from the primary dataplane 604 are transmitted to port 0 610a and port 1 612a of DPU 0 614, and the packets from the shadow dataplane 606 are transmitted to port 0 610b and port 1 612b of DPU 1 618.

Depending on which mode the DPU dual dataplane architecture 600 is in, packets might not be sent to DPU 1 618, and, even when the packets are sent to and processed by DPU 1 618, the packets might not be transmitted from the ports of DPU 1 618 (i.e., port 0 610b and port 1 612b). For example, in the normal mode 404, the shadow dataplane 606 is in standby and does not receive any data packets. In contrast, in scale-out mode 412, the shadow dataplane 606 is active, and both DPUs are engaged in processing and sending packets from their respective ports. Further, in the verification mode 406, however, packets that are identical replicas are sent to and processed by both dataplanes, but only DPU 1 618 transmits the processed packets from its ports.

In the promotion mode 410, there can be a gradual transition over time that starts with DPU 0 614 transmitting the processed packets and end with DPU 1 618 transmitting the processed packets. Accordingly, throughout the promotion mode 410, the "New Primary" dataplane (i.e., shadow dataplane 606) can gracefully transition from not sending packets to the ports to being the only of the two dataplanes that is sending packets to the ports.

Control signals can flow between the control-plane agent 608 and each of the packet dispatcher 602, the primary dataplane 604, and the shadow dataplane 606.

Figures 7A, 7B:
FIG. 7A illustrates a block diagram of an example of a configuration of pairwise primary and shadow dataplanes when there are eight total dataplanes, in accordance with certain embodiments.
FIG. 7B illustrates a block diagram of an example of a scale-out configuration with eight dataplanes, in accordance with certain embodiments.

FIG. 7A and FIG. 7B illustrate a non-limiting scaling up the system to more than two dataplanes. Generally, the total number of dataplanes can be any number N. In this example, the total number of dataplanes is N=8, but a person of ordinary skill in the art will recognize that any number of dataplanes can be used. When pairwise dataplanes are used, the number of dataplanes can be even, such that when in the verification mode 406 each primary dataplane is mirrored by a corresponding shadow dataplane. However, a primary dataplane can also be mirrored by more than one shadow dataplane (e.g., a first shadow dataplane that is implementing a first new version and a second shadow dataplane that is implementing a second new version).

FIG. 7A illustrates pairwise dataplanes. when in a first configuration 700a (e.g., a normal mode 404, a verification mode 406, or a promotion mode 410), each primary dataplane is mirrored by a corresponding shadow dataplane. That is, when in first configuration 700a primary dataplane 1 702a, primary dataplane 2 702b, primary dataplane 3 702c, and primary dataplane 4 702d are mirrored by shadow dataplane 1 704a, shadow dataplane 2 704b, shadow dataplane 3 704c, and shadow dataplane 4 704d, respectively.

FIG. 7B illustrates a non-limiting example of a scale-out-mode configuration 700b for eight dataplanes. When in the scale-out-mode configuration 700b the primary dataplane 1 702a, primary dataplane 2 702b, primary dataplane 3 702c, and primary dataplane 4 702d can remain the same as in the first configuration 700a. The shadow dataplanes are, however, converted to primary dataplanes, as in the dual dataplane examples discussed above. That is, shadow dataplane 1 704a, shadow dataplane 2 704b, shadow dataplane 3 704c, and shadow dataplane 4 704d, respectively become reassigned to primary dataplane 5 706a, primary dataplane 6 706b, primary dataplane 7 706c, and primary dataplane 8 706d, respectively.

Thus, this system can be extended to any number N dataplanes where (N % 2==0). For example, in an implementation using a cluster of 8 DPUs is deployed in a top-of-rack switch, the system operates by creating four pairs of dual dataplanes.

Figure 8A:
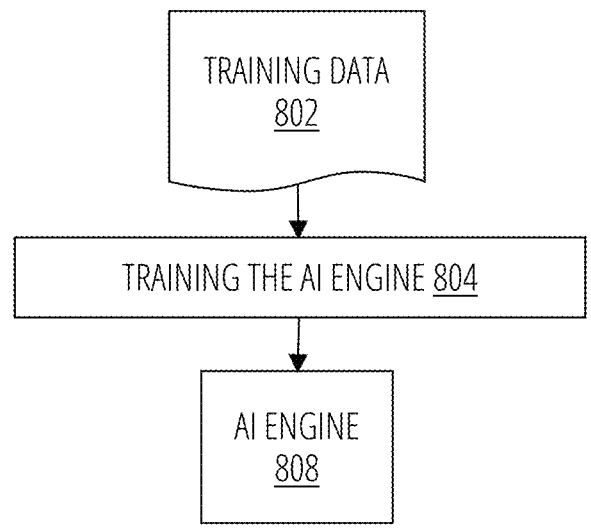
FIG. 8A illustrates a flow diagram for an example of a method of training an artificial intelligence (AI) engine, in accordance with certain embodiments.

FIG. 8A illustrates an example of training an AI engine 808. In step 804, training data 802 (i.e., a corpus of verification metadata) is applied to train the AI engine 808. For example, the AI engine 808 can be an artificial neural network (ANN) that is trained via supervised or unsupervised learning using a backpropagation technique to train the weighting parameters between nodes within respective layers of the ANN.

In supervised learning, the training data 802 is applied as an input to the AI engine 808, and an error/loss function is generated by comparing the output from the AI engine 808 with the desired output (e.g., a known prediction or label associated with the training data 802). The coefficients of the AI engine 808 are iteratively updated to reduce an error/loss function. The value of the error/loss function decreases as outputs from the AI engine 808 increasingly approximate the desired output. In other words, ANN infers the mapping implied by the training data, and the error/loss function produces an error value related to the mismatch between the desired output and the outputs from the AI engine 808 that are produced as a result of applying the training data 802 to the AI engine 808.

Alternatively, for unsupervised learning or semi-supervised learning, training data 802 is applied to train the AI engine 808. For example, the AI engine 808 can be an artificial neural network (ANN) that is trained via unsupervised or self-supervised learning using a backpropagation technique to train the weighting parameters between nodes within respective layers of the ANN.

In unsupervised learning, the training data 802 is applied as an input to the AI engine 808, and an error/loss function is generated by comparing the predictions of the next word in a text from the AI engine 808 with the actual word in the text. The coefficients of the AI engine 808 can be iteratively updated to reduce an error/loss function. The value of the error/loss function decreases as outputs from the AI engine 808 increasingly approximate the training data 802.

For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribićre update, Powell-Beale restart, and scaled conjugate gradient). Additionally, evolutionary methods, such as gene expression programming, simulated annealing, expectation-maximization, non-parametric methods and particle swarm optimization, can also be used for training the AI engine 808.

The training 804 of the AI engine 808 can also include various techniques to prevent overfitting to the training data 802 and for validating the trained AI engine 808. For example, bootstrapping and random sampling of the training data 802 can be used during training.

Further, other machine learning (ML) algorithms can be used for the AI engine 808, and the AI engine 808 is not limited to being an ANN. For example, there are many machine-learning models, and the AI engine 808 can be based on machine-learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 8B:
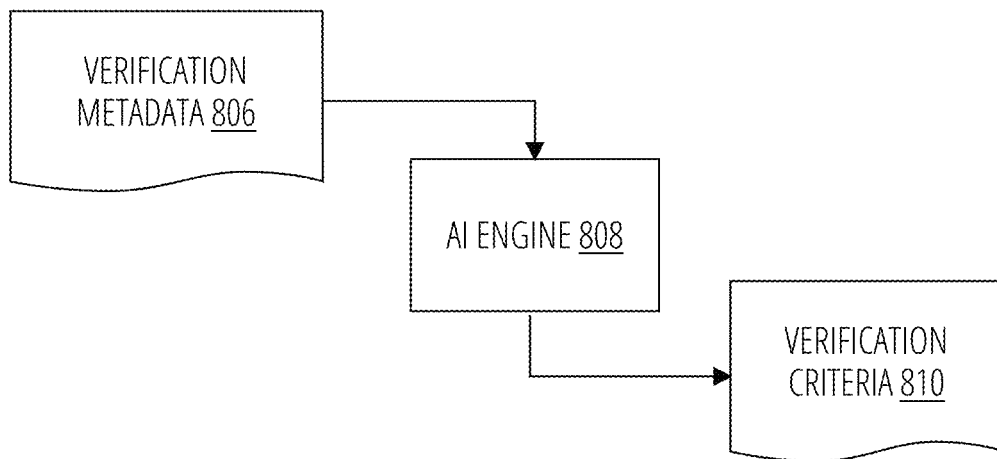
FIG. 8B illustrates a flow diagram for an example of a method of using the trained AI engine, in accordance with certain embodiments.

FIG. 8B illustrates an example of using the trained AI engine 808. The verification metadata 806 is applied to the trained AI engine 808 to generate various outputs, which can include the verification criteria 810.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a system and performs one or more functions when a processor executes the software associated with the service. In some embodiments, a service is a program or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An apparatus implementing a network component, the apparatus comprising:
one or more ports configured to receive ingress traffic and transmit egress traffic;
a packet dispatcher configured to relay received data packets of the ingress traffic to a first dataplane and a second dataplane;
the first dataplane configured to apply first networking instructions of the network component to a first subset of the relayed data packets to determine first egress data packets; and
the second dataplane configured to apply second networking instructions of the network component to a second subset of the relayed data packets to determine second egress data packets, wherein the first dataplane is configurable to operate as a primary dataplane and the second dataplane is configurable to operate as a shadow dataplane;
wherein the first dataplane and second dataplane are configured to switch between a first configuration and a second configuration, wherein in the first configuration both the primary dataplane and the shadow dataplane are active and in the second configuration the primary dataplane is active and the shadow dataplane is in standby.

2. The apparatus of claim 1, wherein:
the packet dispatcher is configured to switch between a mirrored configuration and a non-mirrored configuration,
when in the mirrored configuration, the packet dispatcher mirrors the packets sent to the first dataplane and the second dataplane such that the first subset of the relayed data packets and the second subset of the relayed data packets are identical, and
when in the mirrored configuration, the packet dispatcher sends different subsets of packets to the first dataplane and the second dataplane, such the first subset of the relayed data packets is different from the second subset of the relayed data packets.

3. The apparatus of claim 1, further comprising:
a memory configured to store state information, the memory being accessible to the packet dispatcher, the first dataplane, and the second dataplane, such that the first dataplane and the second dataplane are stateless.

4. The apparatus of claim 1, wherein:
the first dataplane is implemented in a first data processing unit (DPU),
the second dataplane is implemented in a second DPU,
the packet dispatcher is implemented in only one of the first DPU and the second DPU, when in a verification mode, and
the packet dispatcher is implemented in the first DPU and another packet dispatcher is implemented in the second DPU, when in a scale-out mode.

5. The apparatus of claim 1, further comprising:
a plurality of dataplanes comprising an even number N of dataplanes, with N/2 primary dataplanes that are respectively mirrored to N/2 shadow dataplanes;
a plurality of packet dispatchers comprising a total of N/2 packet dispatchers that are respectively associated with the N/2 primary dataplanes and the N/2 shadow dataplanes; and
each dataplane pair comprising one of the N/2 primary dataplanes with a corresponding one of the N/2 shadow dataplanes being configured to switch between a first configuration and a second configuration, wherein, when in the first configuration, both the primary dataplane and the shadow dataplane of the dataplane pair are active, and, when in the second configuration, the primary dataplane of the dataplane pair is active and the shadow dataplane of the dataplane pair is in standby.

6. The apparatus of claim 1, further comprising:
a plurality of dataplanes comprising an even number N of dataplanes, with N/2 primary dataplanes that are respectively mirrored to N/2 shadow dataplanes;
a plurality of packet dispatchers comprising a total of N/2 packet dispatchers that are respectively associated with the N/2 primary dataplanes and the N/2 shadow dataplanes; and each dataplane pair comprising one of the N/2 packet dispatchers being associated with one of the N/2 primary dataplanes and a corresponding one of the N/2 shadow dataplanes, wherein the packet dispatcher of the dataplane pair is configured to switch between a first configuration and a second configuration, wherein, when in the first configuration, the packet dispatcher of the dataplane pair mirrors a subset data packets sent to the shadow dataplane of the dataplane pair with a subset data packets sent to the primary dataplane of the dataplane pair, and, when in the second configuration, the packet dispatcher of the dataplane pair selects the subset data packets sent to the shadow dataplane of the dataplane pair to be unique with respect to subset data packets sent to the primary dataplane of the dataplane pair.

7. The apparatus of claim 1, wherein:

the one or more ports, the first dataplane, and the second dataplane are configured to switch between a first configuration and a second configuration, in the first configuration, the first egress data packets are transmitted from the one or more ports and the second egress data packets are not transmitted from the one or more ports, and in the second configuration, the first egress data packets are transmitted from the one or more ports and the second egress data packets are transmitted from the one or more ports.

8. The apparatus of claim 1, wherein:

the one or more ports, the first dataplane, and the second dataplane are configured to gradually transition between a first configuration and a second configuration, in the first configuration, the first egress data packets are transmitted from the one or more ports and the second egress data packets are not transmitted from the one or more ports, and in the second configuration, the first egress data packets are not transmitted from the one or more ports and the second egress data packets are transmitted from the one or more ports, to thereby promote the second dataplane to be a new primary dataplane and the first dataplane to be a new shadow dataplane.

9. The apparatus of claim 1, further comprising:

a control-plane agent configured to control the first dataplane and the second dataplane, wherein the control-plane agent controls which mode of a plurality of modes the apparatus is in, and the control-plane agent receives signals, the signals representing a performance of the first dataplane when applying the first networking instructions, and the signals representing a performance of the second dataplane when applying the second networking instructions.

10. The apparatus of claim 1, wherein the network component is configured to provide data-packet filtering, load balancing, security screening, malware detection, firewall protection, data-packet routing, data-packet switching, data-packet forwarding, computing header checksums, or implementing network policies.

11. A method of implementing a network component, the method comprising:

receiving, at one or more ports of a network device, ingress traffic comprising data packets;

relaying, through a packet dispatcher, the received data packets of the ingress traffic to a first dataplane and a second dataplane;

applying, at the first dataplane, first networking instructions of the network component to a first subset of the relayed data packets to determine first egress data packets; and applying, at the second dataplane, second networking instructions of the network component to a second subset of the relayed data packets to determine second egress data packets, wherein the first dataplane is configurable to operate as a primary dataplane and the second dataplane is configurable to operate as a shadow dataplane;

wherein the first dataplane and second dataplane are configured to switch between a first configuration and a second configuration, wherein in the first configuration both the primary dataplane and the shadow dataplane are active and in the second configuration the primary dataplane is active and the shadow dataplane is in standby.

12. The method of claim 11, further comprising:

switching the packet dispatcher between a mirrored configuration and a non-mirrored configuration, wherein when in the mirrored configuration, the packet dispatcher mirrors the packets sent to the first dataplane and the second dataplane such that the first subset of the relayed data packets and the second subset of the relayed data packets are identical, and when in the mirrored configuration, the packet dispatcher sends different subsets of packets to the first dataplane and the second dataplane, such the first subset of the relayed data packets is different from the second subset of the relayed data packets.

13. The method of claim 11, further comprising:

storing state information in a memory that is accessible to the packet dispatcher, the first dataplane, and the second dataplane, such that the first dataplane and the second dataplane are stateless.

14. The method of claim 11, further comprising:

switching the one or more ports, the first dataplane, and the second dataplane between a first configuration and a second configuration, wherein in the first configuration, the first egress data packets are transmitted from the one or more ports and the second egress data packets are not transmitted from the one or more ports, and in the second configuration, the first egress data packets are transmitted from the one or more ports and the second egress data packets are transmitted from the one or more ports.

15. The method of claim 11, further comprising:

gradually transitioning the one or more ports, the first dataplane, and the second dataplane from a first configuration and a second configuration, wherein in the first configuration, the first egress data packets are transmitted from the one or more ports and the second egress data packets are not transmitted from the one or more ports, and in the second configuration, the first egress data packets are not transmitted from the one or more ports and the second egress data packets are transmitted from the one or more ports, to thereby promote the second dataplane to be a new primary dataplane and the first dataplane to be a new shadow dataplane.

16. The method of claim 11, further comprising:
controlling, using a control-plane agent, transitions among a plurality of modes for the packet dispatcher, the first dataplane, and the second dataplane among a plurality of modes, and
receiving, at the control-plane agent, signals from the first dataplane and the second dataplane, wherein the signals represent a performance of the first dataplane when applying the first networking instructions and a performance of the second dataplane when applying the second networking instructions.

17. The method of claim 11, wherein:
the network component is either implemented on one or more data processing units (DPUs) or implemented as software executed on one or more central processing units (CPUs).

18. A computing apparatus comprising:
a processor; and
a memory storing instructions that, when executed by the processor, configure the apparatus to:
receive, at one or more ports of a network device, ingress traffic comprising data packets;
relay, through a packet dispatcher, the received data packets of the ingress traffic to a first dataplane and a second dataplane;
apply, at the first dataplane, first networking instructions of the network component to a first subset of the relayed data packets to determine first egress data packets; and
apply, at the second dataplane, second networking instructions of the network component to a second subset of the relayed data packets to determine second egress data packets, wherein the first dataplane is configurable to operate as a primary dataplane and the second dataplane is configurable to operate as a shadow dataplane;
wherein the first dataplane and second dataplane are configured to switch between a first configuration and a second configuration, wherein in the first configuration both the primary dataplane and the shadow dataplane are active and in the second configuration the primary dataplane is active and the shadow dataplane is in standby.

* * * * *